Patented June 25, 1940

UNITED STATES PATENT OFFICE 2,205,870

PHOTOGRAPHIC FILTER LAYER

Gustav Wilmanns, Wolfen (Kreis Bitterfeld), and Wilhelm Schneider and Alfred Froehlich, Dessau, Germany, assignors, by mesne assignments, to General Aniline & Film Corporation, New York, N. Y., a corporation of Delaware No Drawing. Application October 2, 1937, Serial No. 167,020. In Germany October 27, 1936

2 Claims. (Cl. 88—114)

This invention relates to photographic filter layers and more particularly to layers absorbing the ultra-violet rays.

It is an object of the invention to provide a process by which filter layers for various purposes of photography may be obtained, which absorb all ultra-violet radiation without unfavorably affecting the sensitivity and radiation of the adjacent emulsion layers.

A further object is to provide filter layers containing compounds which are impermeable to ultra-violet radiation and are at the same time fast to diffusion with respect to the binding material of the layer.

Further objects will be apparent from the detailed specification following hereafter.

Filters for absorbing ultra-violet light consist either of glass which as such or in consequence of certain additions absorbs ultra-violet light or of glass and a colloid layer, for instance gelatin, which contains a substance that absorbs ultra-violet light, such as aesculine, quinine sulfate or a cyanine dyestuff.

This invention is only concerned with layers which are cast directly onto a light-sensitive emulsion or are intercalated between various emulsion layers.

It relates to the production of particularly useful ultra-violet filters by incorporating with a colloid capable of forming layers as the chief constituent a substance that is fast to diffusion owing to the fact that it contains as substituents at least one suitable molecular group.

Colloids suitable for forming the layers are, for example, gelatin, tragacanth, gum arabic or like substances. The substances to be used in the process of the invention for absorbing ultra-violet rays may be added to the solution of colloid in aqueous solution, but once incorporated in the colloid they cannot be separated therefrom by washing.

The substances that absorb ultra-violet light and are fast to diffusion in the colloid have a definite constitution of the molecule which shows a certain affinity for the colloid comparable with that of dyestuffs which show affinity to cotton. Such compounds always contain a constituent in the molecule which absorbs ultra-violet light, for instance 2-hydroxychrysene-8-carboxylic acid,
2-hydroxyanthracene-3-carboxylic acid,
2-hydroxychrysene,
3-hydroxy- and 3-aminopyrene, fluorene and its derivatives, derivatives of naphthalene, and like compounds and a radical which makes these compounds fast to diffusion with respect to the colloid. Such radicals lending fastness to diffusion are, for example, compounds with carbamide derivatives, for example the carbamide from 2 mol para-aminobenzoyl-para-phenylene diamine sulfonic acid, also benzidine derivatives, for example the benzidide of 2.3-hydroxy-anthracene carboxylic acid and corresponding derivatives, further derivatives of diaminostilbene, of diaminodiphenyl urea, of diaminodiphenyl thiourea, of amino-benzoyl- and benzylidene-compounds which on their part may contain any substituents. Such bodies are, for example, the condensation product from 2 mol 2-hydroxy-chrysene 8-carboxylic acid chloride and para-para'-aminobenzoyl-benzidine.

The substances which absorb ultra-violet light can be made fast to diffusion in gelatin if there is incorporated in their molecule a heterocyclic radical, for example thiazole, imidazole, oxazole, and quinoline. By introduction into the molecule of one or more radicals of the above mentioned group the fastness to diffusion of these compounds may be substantially increased. Substances of this kind which absorb ultra-violet light are, for example, the reaction product from 2-hydroxychrysene 8-carboxylic acid chloride and 2-aminobenzthiazole.

The cyanuric ring has proved particularly suitable. For example two chlorine atoms in cyanuric chloride may be exchanged for aminofluorene radicals and then two molecules of the resulting compound may be combined with benzidine by means of the residual chlorine atom in each of the cyanuric chloride radicals. In the same compound the diphenyl configuration which is a very favorable one for the purpose of the invention, may be introduced in another way by exchanging in known manner the third chlorine atom for an amino-group and connecting two such amino-compounds by means of 4.4'-diphenyl carboxylic acid chloride. Such compounds fast to diffusion are added to the colloid in the form of their sodium salts in aqueous solution; in this operation a portion of the water may be exchanged for an organic solvent, for instance alcohol, in order to obtain a higher concentration.

There may also be used as substances which absorb ultra-violet light and are fast to diffusion in the colloid compounds in which a part of the molecule has a chain formation. Such substances are, for example, compounds having carbon chains of more than 5 carbon atoms and more especially those having more than 12 carbon atoms which may contain any kind of substituent; the chain may be branched or interrupted by another atom. Such carbon chains are, for example, aliphatic radicals, fatty acid radicals, carbohydrate radicals, radicals of peptide character, polymerizates from ethylene oxide and its analogues and homologues. These long chain radicals are particularly suited if they contain a group favoring the solubility in water, as for instance the —SO₃H group, the carboxyl group, or the hydroxy group. Compounds which absorb ultra-violet light and are of this type are, for example 2-aminochrysene-8-sulfonic acid, the amino group of which has been caused to react with stearic acid chloride or cetyl iodide;

2-aminofluorene-3-carboxylic acid whose amino-group contains as a substituent a radical of 10-12 ethylene imines;

The reaction product from 2-hydroxyanthracene-3-carboxylic acid chloride and serum albumin;

The reaction product of 2-hydroxyfluorene-3-carboxylic acid chloride with rice starch, which should be pretreated with ethylene oxide;

The reaction product from undecylic acid chloride and para-para'-aminobenzoyl-4-4'-diamino-stilbene-3-3'-disulfonic acid;

The reaction product from 4.4'-aminobenzoyl-benzidine and β-naphthalene acid chloride.

One can also obtain suitable products by reaction of a chloride of polymerized hydroxy-phenyl carboxylic acid with bodies that absorb ultra-violet and contain amino-groups.

Instead of the stated substituents having long chain structure there may be used a system of hydrogenated rings, for example 2-3-hydroxy-fluorene carboxylic acid may be combined with perhydro-4-aminodiphenyl or with β-aminodec-aline or 2 mols of 2-hydroxychrysene-8-carboxylic acid chloride may be combined with 1 mol of 4.4'-diaminodecahydrodiphenyl.

A further possibility of making substances that absorb ultra-violet light fast to diffusion in the layer forming colloid consists in combining such substance with a natural resin or a conversion product thereof, for example 2-aminofluorene-3-carboxylic acid ethyl ester is caused to react with abietic acid chloride or with colophonium chloride and then the ester group is split off by means of dilute alkali.

Instead of these resins there may be used suitable sterols or their conversion products, for example cholesterol dicarboxylic acid or its scission products, for example cholic acid. As an instance of such an ultra-violet absorbing substance may be named the reaction product of aminoanthracene carboxylic acid and cholic acid chloride or the reaction product of hydroxy-chrysene acid chloride and cholesterylamine.

The bodies named are soluble in sodium carbonate solutions so far as they contain sulfonic or carboxylic acid groups and so far as they are derivatives of for instance peptides or carbohydrates they are soluble in water and may be added to aqueous solutions of the colloid. Substances which are within the ambit of this invention are always characterized by the fact that when added to the colloid the layer dries transparent, a result which may be advantageously aided by subjecting the colloid to a pretreatment with a mordant, for instance with a metal oxide.

What we claim is:

1. A filter layer absorbing ultra-violet radiation, which comprises a colloidal emulsion layer and incorporated therein an aromatic hydrocarbon capable of absorbing ultra-violet light and selected from the class consisting of chrysene, anthracene, pyrene, fluorene and naphthalene, said compound being substituted by an aliphatic radical containing a carbon chain of at least 12 carbon atoms.

2. A filter layer absorbing ultra-violet radiation, which comprises a colloidal emulsion layer and incorporated therein an aromatic hydrocarbon capable of absorbing ultra-violet light and selected from the class consisting of chrysene, anthracene, pyrene, fluorene and naphthalene, said compound being substituted by an aliphatic radical containing a carbon chain of at least 12 carbon atoms, and containing in its molecule a solubilizing radical selected from the class consisting of the sulfonic acid group, the carboxylic acid group, and the hydroxy group.

GUSTAV WILMANNS.
WILHELM SCHNEIDER.
ALFRED FROEHLICH.